(12) United States Patent
Komatsu (10) Patent No.: US 6,206,466 B1
(45) Date of Patent: *Mar. 27, 2001

(54) AUTOMOBILE SEAT

(75) Inventor: Tadayoshi Komatsu, Toyota (JP)

(73) Assignee: Mitsubishi Jidosha Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/890,552

(22) Filed: Jul. 9, 1997

(30) Foreign Application Priority Data

Jul. 9, 1996 (JP) .................................... 8-179628

(51) Int. Cl.[7] ............................. B60N 2/42; B60R 21/00
(52) U.S. Cl. ............................. 297/216.13; 297/216.1; 280/728.3; 280/730.2
(58) Field of Search ................. 297/216.13, 216.14; 280/730.2, 728.3

(56) References Cited

U.S. PATENT DOCUMENTS

| | | | |
|---|---|---|---|
| 5,096,220 | * | 3/1992 | Nakajima ............................ 280/728.3 |
| 5,338,059 | * | 8/1994 | Inoue et al. ........................ 280/728.3 |
| 5,375,876 | * | 12/1994 | Bauer et al. ....................... 280/728.3 |
| 5,393,089 | * | 2/1995 | Pakulsky et al. .................. 280/728.3 |
| 5,449,196 | * | 9/1995 | Ohno et al. ........................ 280/728.3 |
| 5,498,030 | * | 3/1996 | Hill et al. ...................... 280/730.2 X |
| 5,533,750 | * | 7/1996 | Karlow et al. ..................... 280/730.2 |
| 5,553,887 | * | 9/1996 | Karlow et al. ..................... 280/730.2 |
| 5,611,564 | * | 3/1997 | Bauer ................................. 280/728.3 |
| 5,630,615 | * | 5/1997 | Miesik ............................... 280/730.2 |
| 5,639,111 | * | 6/1997 | Spencer et al. ................ 280/730.2 X |
| 5,651,582 | * | 7/1997 | Nakano ............................. 297/216.13 |
| 5,678,853 | * | 10/1997 | Maly ................................. 280/730.2 |
| 5,687,987 | * | 11/1997 | Spencer et al. ................ 280/730.2 X |
| 5,803,485 | * | 9/1998 | Acker et al. ................... 280/730.2 X |
| 5,810,389 | * | 9/1998 | Yamaji et al. ..................... 280/730.2 |
| 5,816,610 | * | 10/1998 | Higashiura et al. .......... 280/730.2 X |
| 5,860,673 | * | 1/1999 | Hasegawa et al. ................ 280/730.2 |
| 5,863,063 | * | 1/1999 | Harrell ......................... 280/728.3 X |
| 5,893,579 | * | 4/1999 | Kimura et al. ................ 280/728.3 X |
| 5,899,489 | * | 5/1999 | Jost ............................. 280/728.3 X |
| 5,975,567 | * | 11/1999 | Higashiura .................. 297/216.13 X |
| 6,003,938 | * | 12/1999 | Lachat et al. .................... 297/216.13 |

FOREIGN PATENT DOCUMENTS

| | | | |
|---|---|---|---|
| 2503447 | * | 8/1975 | (DE) ...................................... 280/732 |
| 1800621 | | 4/1996 | (DE) . |
| 0719678 A1 | | 7/1996 | (EP) . |
| 0768215 A2 | | 4/1997 | (EP) . |
| 2296476 | | 7/1996 | (GB) . |
| 0248946 | * | 11/1991 | (JP) ...................................... 280/732 |
| 403281455 | * | 12/1991 | (JP) .................................. 280/730.2 |
| 4-50052 | | 2/1992 | (JP) . |
| 405270342 | * | 10/1993 | (JP) ...................................... 280/732 |
| 7-215159 | | 8/1995 | (JP) . |
| 7-228213 | | 8/1995 | (JP) . |
| 8225052 | | 9/1996 | (JP) . |
| 8258660 | | 10/1996 | (JP) . |
| 8258661 | | 10/1996 | (JP) . |
| 2 62439 | | 11/1995 | (TW) . |
| 97 42062 A1 | | 11/1997 | (WO) . |

OTHER PUBLICATIONS

Volvo Catalogue 1995 (5 pages).

* cited by examiner

Primary Examiner—Peter M. Cuomo
Assistant Examiner—Rodney B. White (57) ABSTRACT

An automobile seat is provided with a side impact air bag accommodated within a seat back. To permit prompt burst-out of the side impact air bag precisely at a predetermined position in a predetermined direction without the need for the arrangement of a member different in nature from a surface of the seat back on the surface of the seat back, an air bag module is arranged within a cushion pad of the seat back. Further, the cushion pad is provided, on a surface of a surrounding portion thereof with which the air bag is brought into contact upon spreading, with a guide member which increases breaking strength of the cushion pad and specifies the cushion pad to be broken at a break portion under inflating force of the air bag.

17 Claims, 12 Drawing Sheets

FIG. 13

AUTOMOBILE SEAT

BACKGROUND OF THE INVENTION a) Field of the Invention

This invention relates to an automobile seat with a side-impact air bag accommodated within a seat back, and especially to an automobile seat which permits adjustments of position and direction of burst-out of an air bag as needed.

b) Description of the Related Art

In recent years, air bags have been attracting attention as safety measures for automobiles, and have already found wide-spread commercial utility. Significant popularity is observed especially with longitudinal-impact air bags, each type of which bursts out toward a driver from a location in front of the driver to cushion forward impact. In addition, developments of side-impact air bags (side air bags) have been under way, also resulting in the increasing commercial utilization of these. A side-impact air bag bursts out from a location to the side of an occupant to cushion striking of an automobile body, located on an outboard side of the occupant, against the occupant.

Such a side air bag is caused to burst out between a side body of an automobile and an occupant in the event of a side impact to cushion collision between the side body and the occupant. Due to an extremely short distance between the side body and the occupant, the side air bag is required to have a higher inflation responsiveness than a longitudinal-impact air bag. Moreover, it is also necessary to allow the side air bag to burst out to an appropriate position so that the cushioning of an impact against the occupant can be ensured.

A construction is proposed, for example, in Japanese Patent Application Laid-Open (Kokai) No. HEI 4-50052, in which a side air bag is arranged in a side portion of a seat back and the direction to which the side air bag bursts out is determined by setting the position of an inflator equipped with a detonator.

Another construction is proposed in Japanese Patent Application Laid-Open (Kokai) No. HEI 7-215159, in which a side air bag is also arranged in a side portion of a seat back and the direction to which of the side air bag bursts out is determined by guide means.

A further construction is proposed in Japanese Patent Application Laid-Open (Kokai) No. HEI 7-228213, in which the direction to which a side air bag bursts out is defined by a lid arranged over an opening of a seat back, through which the side air bag is allowed to burst out.

In each of the constructions disclosed in Japanese Patent Applications Laid-open (Kokai) Nos. HEI 4-50052 and HEI 7-215159, an opening through which the side air bag is allowed to burst out is also formed in the seat back, and a lid is also arranged over the opening.

However, each of the above-described conventional arts is of the construction where the side air bag bursts out through a lid-covered opening, the lid exposed through the surface of the seat back. It is therefore difficult to assure good external appearance. Moreover, the lid is formed of a material such as a resin of different nature and substantially different touch from that of the surface of the seat back so that the lid cannot be positioned on a front side of the seat back where it would come in contact with the seated occupant's body. Therefore the lid is arranged on a side wall of the seat back. As a consequence, the opening through which the side air bag bursts out is also arranged on the side wall of the seat back, leading to the problem that a limitation is imposed on the direction to which the side air bag bursts out.

There is, accordingly, a desire for a construction in which a side air bag is accommodated within a seat back without the arrangement of a lid different in nature from the surface of the seat back. In this case, however, the opening which was closed over by the lid obviously cannot be formed in the surface of the seat back. Namely, a seat back construction in which an opening is formed in a surface of the seat back without closing it with a lid or the like lacks commercial attraction.

Without such an opening in a seat back, the burst-out of the side air bag is interfered with by the seat back when a side air bag in the seat back is caused to expand by an inflator. This makes it difficult for the side air bag to burst out of the seat back. Even if the side air bag is allowed to burst out, there are problems that this burst-out tends to be low in responsiveness and is not easily controllable in direction.

SUMMARY OF THE INVENTION

With the foregoing problems in view, the present invention has as an object thereof the provision of an automobile seat which accommodates therein a side-impact air bag and can promptly achieve burst-out of the side-impact air bag at a predetermined position in a predetermined direction without the need for the arrangement of a member different in nature from a surface of a seat back on the surface of the seat back.

To achieve the above-described object, the present invention provides an automobile seat having a seat back and a side-impact air bag module accommodated within the seat back. The side-impact air bag module is provided with an air bag which is caused to burst out of the seat and to spread between an occupant and an automobile body in the event of a side impact. The seat back is provided with a cushion pad in which the side-impact air bag module is arranged; and the cushion pad is provided with, on a surface thereof at and around a portion thereof with which the air bag would be brought into contact upon spreading, a guide member which specifies the cushion pad to be broken at a break portion under inflating force of the air bag. The guide member may preferably be formed as a reinforcing member so that the guide member covers the surface of the cushion pad and increases the breaking strength of the cushion pad. Preferably, the guide member has been arranged integrally on the surface of the cushion pad upon molding the cushion pad or is adhered on the surface of the cushion pad. Further, the guide member may preferably be a fabric sheet such as a cloth or a non-woven fabric, or a sheet-shaped material having flexibility such as a resin sheet.

Despite the accommodation of the side-impact air bag, the above construction can have an external appearance similar to general seats (i.e., seats without accommodation of a side-impact air bag). It is therefore possible to promptly burst the air bag at a predetermined position in a predetermined direction while retaining the attractiveness of the seat.

Further, a weakened portion may desirably be formed in the surface of the cushion pad at the break portion specified by the guide member. In this case, the weakened portion may be arranged as a notch formed in the cushion pad. As an alternative, plural notches may be formed at predetermined intervals in a vertical direction of the seat back. Needless to say, these intervals can be either the same or different. As another alternative, the notch may be formed as a slot in a vertical direction of the seat back.

These features can further improve the effects that the air bag is allowed to promptly burst out at a predetermined position in a predetermined direction.

Further, the seat back may additionally be provided with a seat frame supporting the cushion pad thereon; and the air bag module may be mounted on the seat frame.

The above-described features make it possible to mount an air bag module with relative ease.

BRIEF DESCRIPTION OF THE DRAWINGS

FIG. 9(A) and FIG. 9(B) illustrate the seat back of the automobile seat according to the second embodiment of the present invention, in which

DETAILED DESCRIPTION OF THE INVENTION AND PREFERRED EMBODIMENTS

Referring first to FIG. 1 through FIG. 7, the first embodiment of the present invention will be described.

Figure 3:
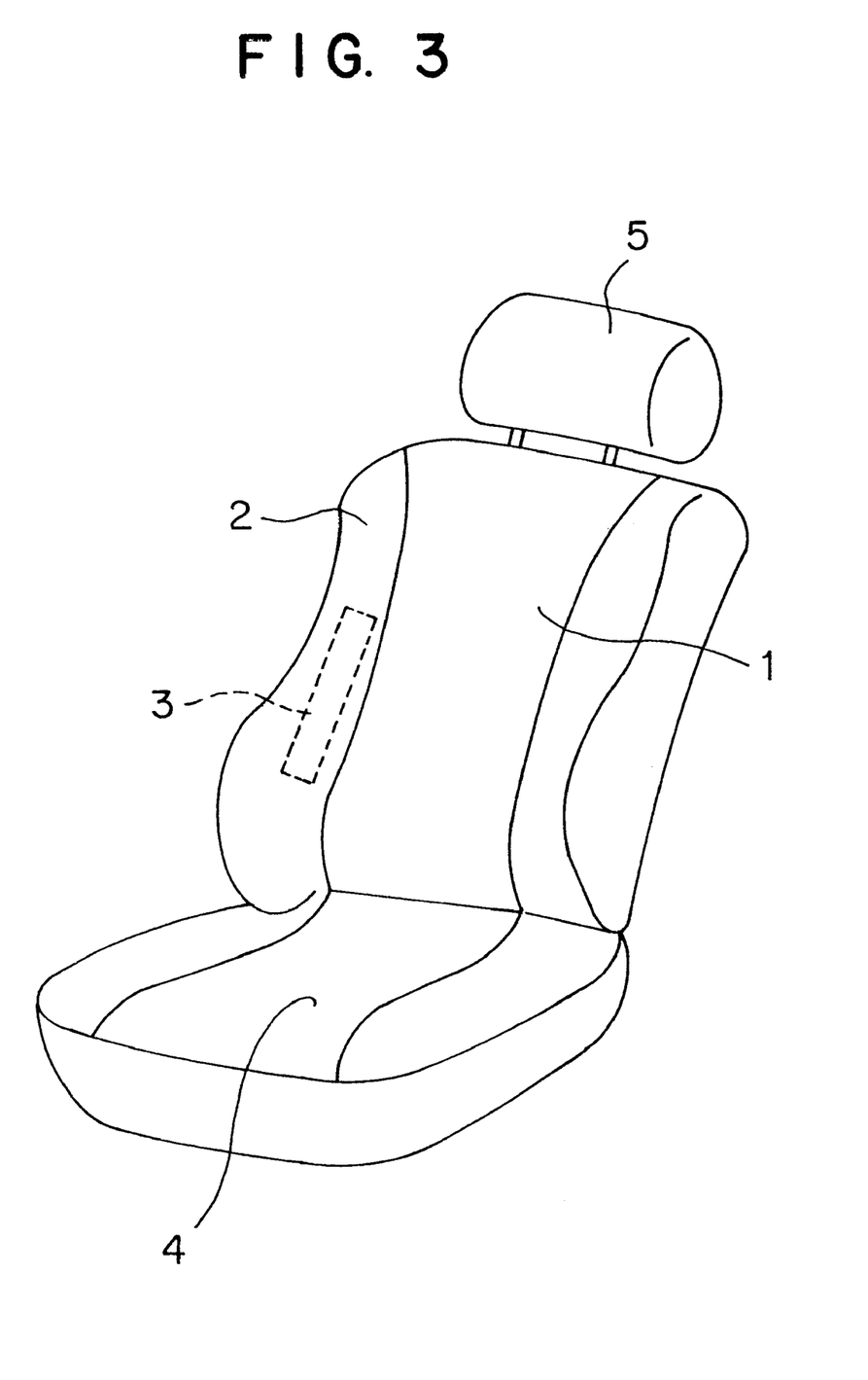
FIG. 3 is a perspective view of the automobile seat according to the first embodiment of the present invention.

In the automobile seat according to the first embodiment, a side-impact air bag module 3 is accommodated within a side portion 2 of a seat back 1 as illustrated in FIG. 3. As readily understood from the drawing, the side-impact air bag module 3 is arranged within the side portion 2 of the seat back, said side portion 2 being on a side of a side body (in general, on a door side), so that the side-impact air bag module 3 extends in a vertical direction. Although the first embodiment will be described taking a right-side seat (for example, a driver's seat of a right-hand drive automobile) as an example, a left-side seat (for example, a front passenger's seat of the right-hand drive automobile) is constructed symmetrically with respect to the right-side seat. Incidentally, designated at numerals 4 and 5 in FIG. 3 are a seat cushion and a headrest, respectively.

Figure 4:
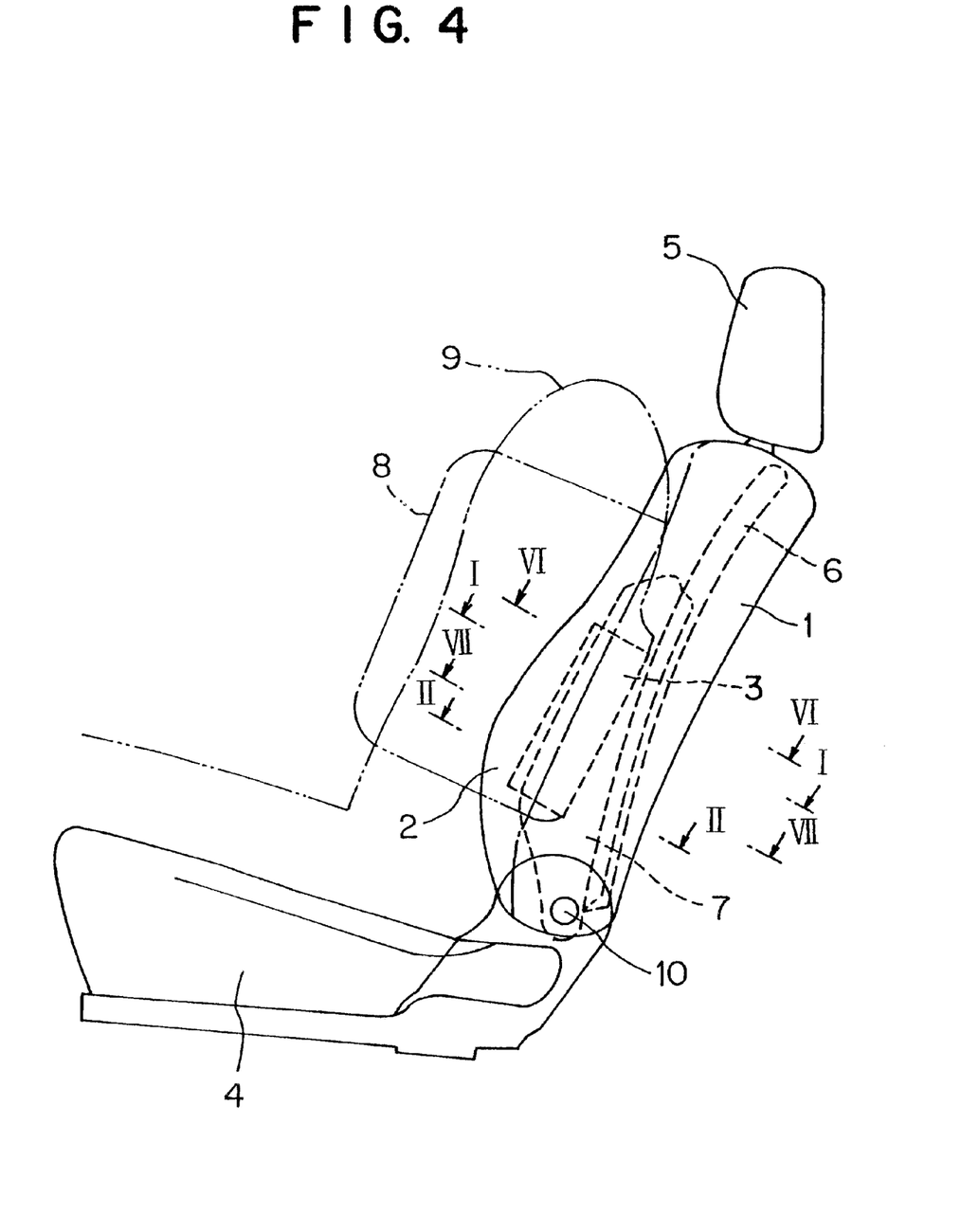
FIG. 4 is a side view of the automobile seat according to the first embodiment of the present invention.
Figure 5:
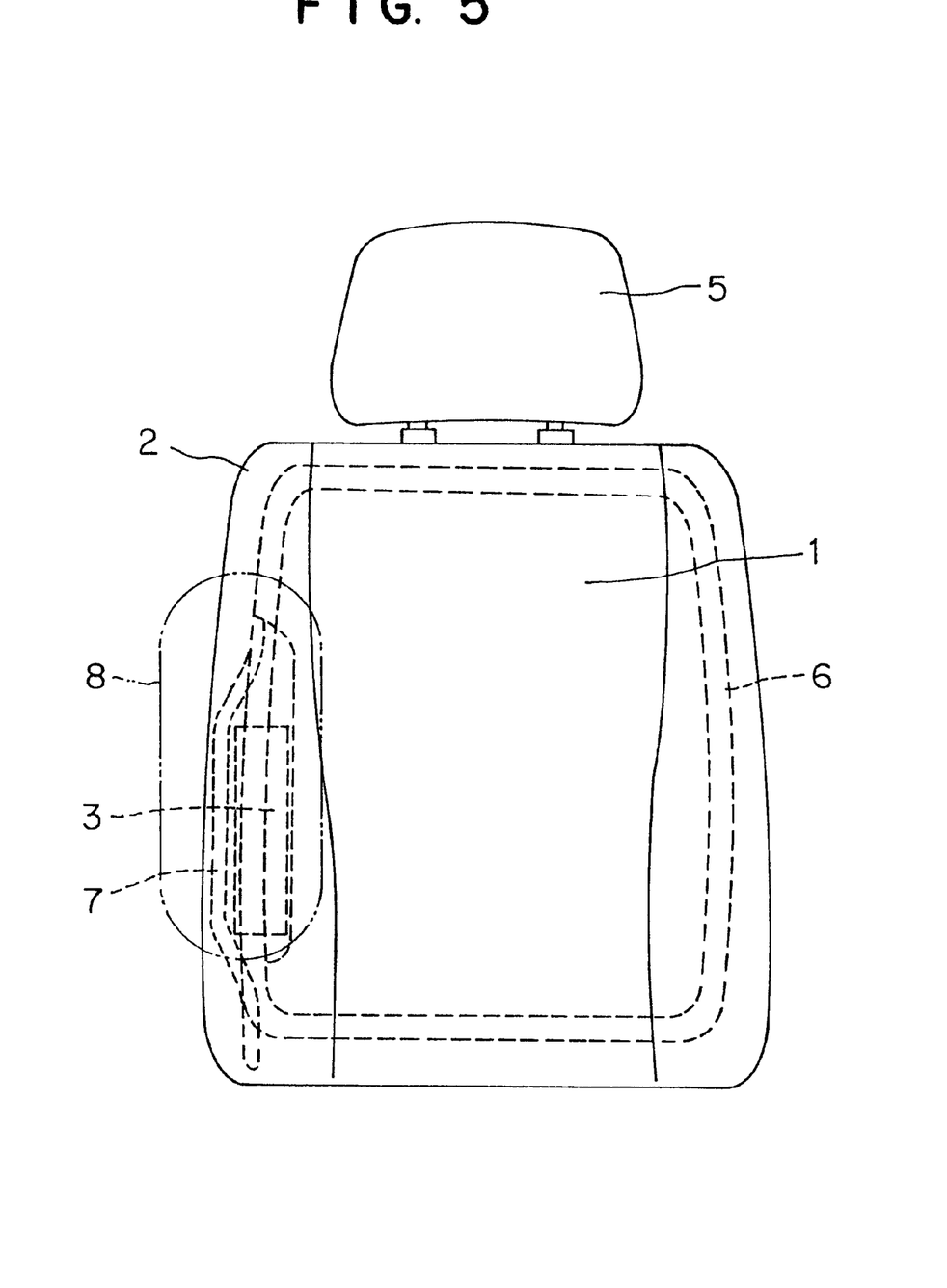
FIG. 5 is a front view of a seat back of the automobile seat according to the first embodiment of the present invention.
Figure 6:
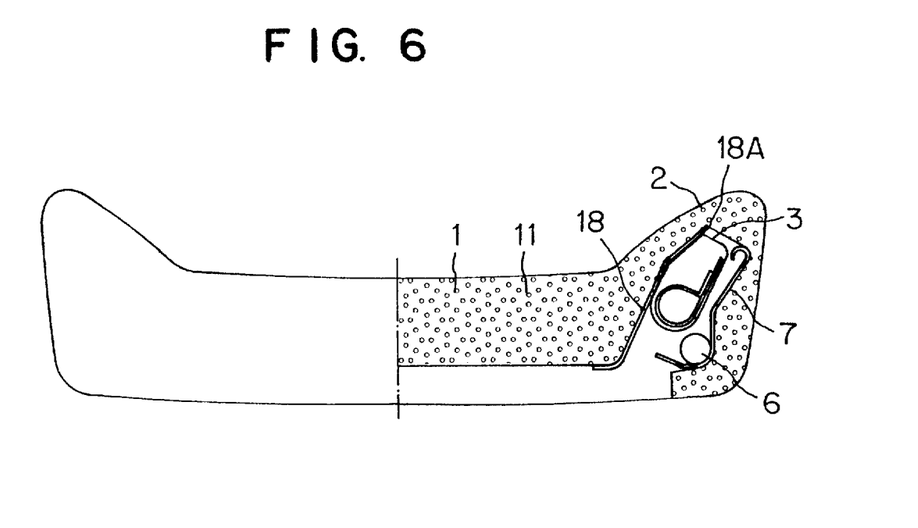
FIG. 6 is a cross-sectional view of the seat back of the automobile seat according to the first embodiment of the present invention, taken in the direction of arrows VI—VI of FIG. 4.
Figure 7:
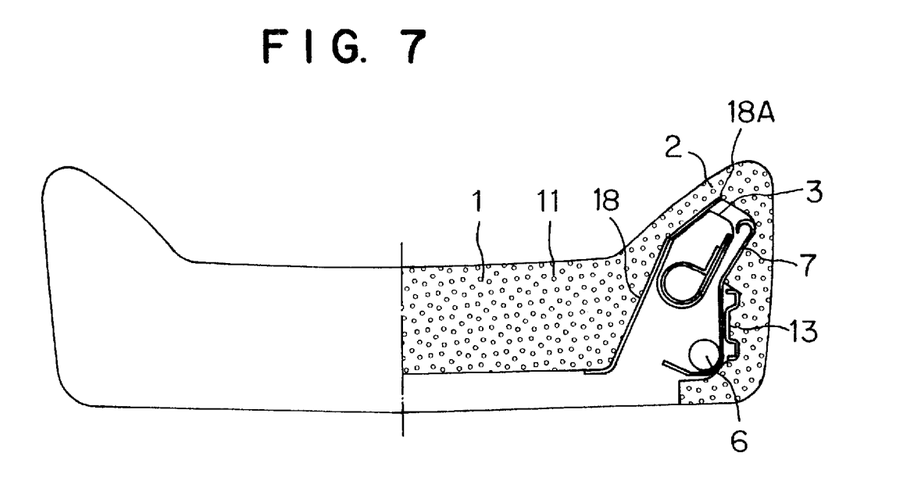
FIG. 7 is a cross-sectional view of the seat back of the automobile seat according to the first embodiment of the present invention, taken in the direction of arrows VII—VII of FIG. 4.

As depicted in FIGS. 4 and 5, the side-impact air bag module 3 is fixed on an air bag module mounting bracket 7 which also serves as a side support member (hereinafter called the "mounting bracket"). This mounting bracket 7 is, in turn, connected to a seat back frame (hereinafter called the "frame") 6. In FIGS. 4 and 5, numeral 8 indicates a shape of an air bag when inflated, numeral 9 schematically represents the body of an occupant in the seat, and numeral 10 designates a reclining hinge portion of the seat back 1.

Namely, as is illustrated in FIGS. 1, 2, 6 and 7, a space 12 which can accommodate the frame 6 therein is formed in a rear side of a cushion pad 11 which makes up a portion of the seat back, said portion being located adjacent a surface of the seat back. The cushion pad 11 is arranged so that the frame 6 is positioned within the space 12.

The frame 6 is connected to the hinge portion 10 of the seat back 1. In a lower part of the seat back 1, a reclining frame 13 is arranged in a state that it is connected to the frame 6.

The space 12 on the rear side of the cushion pad 11 is formed with a size large enough to accommodate therein the mounting bracket 7 and the side-impact air bag module 3 in addition to the frame 6. The mounting bracket 7 extends vertically within the side portion 2 of the seat back, with a rear end portion 7A fixedly secured on the frame 6 by welding or the like. On a front end portion 7B of the mounting bracket 7, said front end portion 7B being located close to the surface of the seat back, a mounting surface 14 is formed for mounting the side-impact air back module 3 on the mounting bracket 7. The side-impact air bag module 3 is fixed to the mounting surface 14 and is arranged within the space 12 on the rear side of the cushion pad 11.

The frame 6, the reclining frame 13 and the mounting bracket 7, which form a skeleton of the seat back 1, and the side-impact air bag module 3 are, therefore, covered by the cushion pad 11 whose stiffness and thickness have been adjusted to prevent the frame 6, the reclining frame 13, the mounting bracket 7 and the side-impact air bag module 3 from externally affecting the feeling of touch to the seat back 1.

Figure 1:
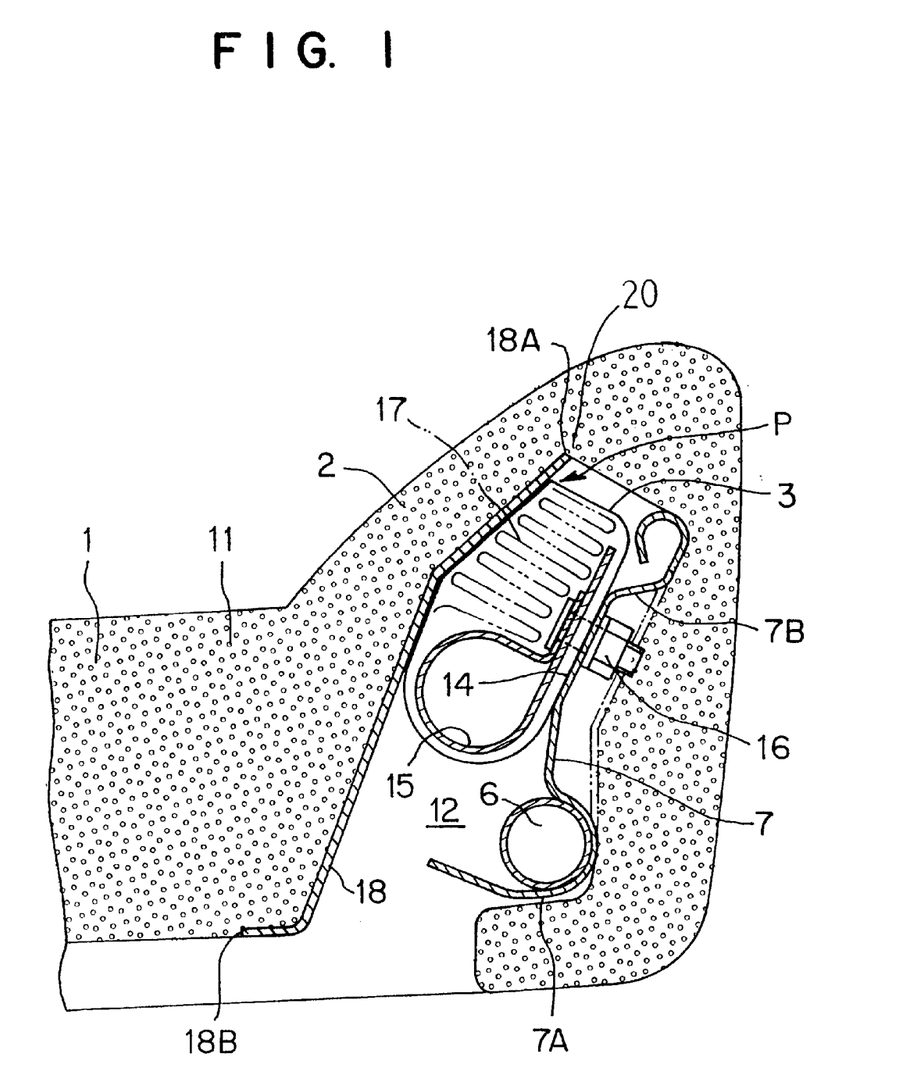
FIG. 1 is a fragmentary cross-sectional view of an automobile seat according to a first embodiment of the present invention, taken in the direction of arrows I—I of FIG. 4.
Figure 2:
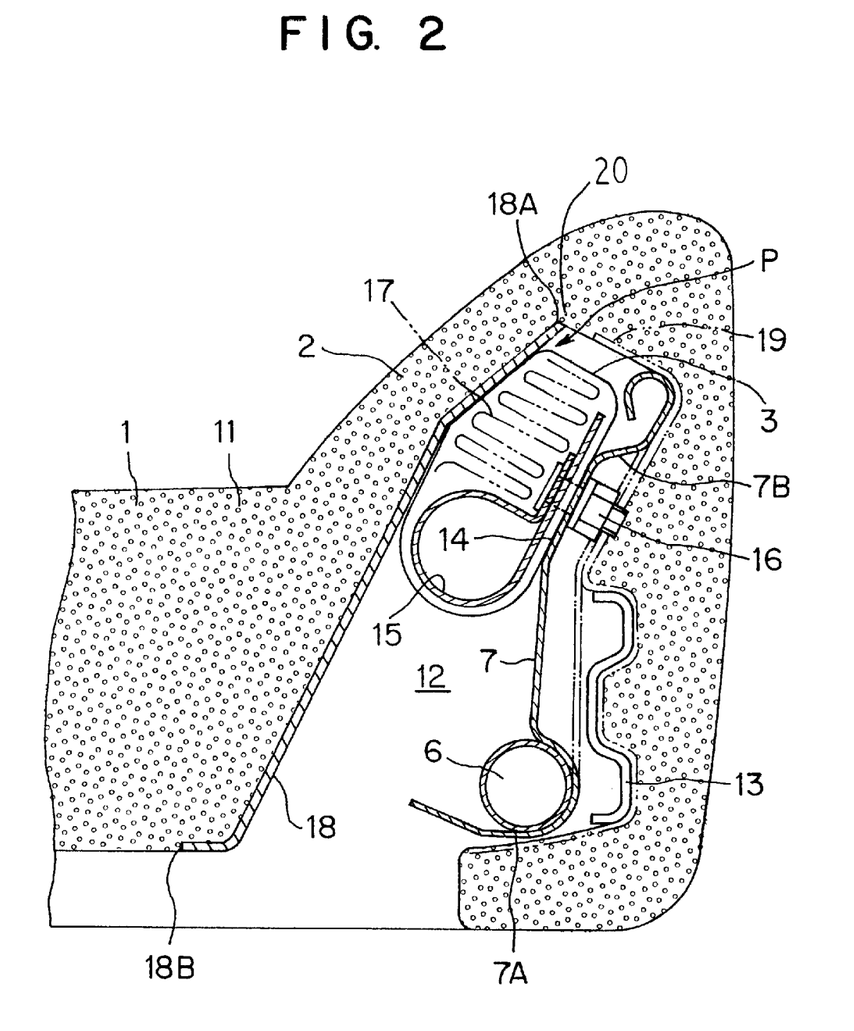
FIG. 2 is a fragmentary cross-sectional view of the automobile seat according to the first embodiment of the present invention, taken in the direction of arrows II—II of FIG. 4.

The mounting surface 14 is arranged aslant so that it faces toward an inner side of the automobile, which is a side opposite to the side body (leftwards in FIGS. 1 and 2), and also toward a front part of the vehicle (upwards in FIGS. 1 and 2). The side-impact air bag module 3 is fixed by fastening its base 15 on the mounting surface 14 by a bolt and a nut 16.

A side air bag main body 17, which may also be called simply a "side air bag" or "air bag", is contained within the side-impact air bag module 3. This air bag 17 is inflated by gas from an unillustrated inflator. Namely, when the automobile is subjected to side impact force of a predetermined value (in general, a predetermined acceleration) or greater, a detonator contained in the side-impact air bag module 3 is caused to explode so that gas is released into the air bag 17.

Since the air bag 17 is arranged in a more forward part of the automobile than the base 15, the air bag 17 is caused to burst out substantially forward while being guided by the base 15. In addition, the unillustrated inflator is also arranged in a rear part of the automobile with respect to the air bag 17 and hence also guides the forward burst-out of the air bag 17.

The guiding of burst-out of the air bag 17 by the base 15 and the inflator arranged, as described above, is approximate, so that the position and direction of burst-out cannot be specified precisely. To cope with this problem, this embodiment is provided with a construction such as that to be described next.

Namely, as is illustrated in FIGS. 1 and 2, the cushion pad 11 is provided on a rear side thereof, with a reinforcing member 18 as a guide member for increasing the strength of the cushion pad 11 and defining, adjacent an end portion 18A of the reinforcing member 18, a portion 20 along which the cushion pad 11 breaks under bursting force of the air bag 17. As this reinforcing member 18, a fabric having a certain degree of thickness is used.

This reinforcing member 18 is arranged so that it extends from a point sufficiently apart from the position of arrangement of the side-impact air bag module 3 toward a center of the seat back to a point located in front of the position of arrangement of the side impact bag module 3. Especially in front of the position of arrangement of the side-impact air bag module 3, the reinforcing member 18 is arranged extending up to the end portion 18A which corresponds to a burst-out commencing position P of the air bag 17 (in other words, to a position where the air bag 17 is desired to commence burst-out). Conversely speaking, the reinforcing member 18 is not arranged beyond the point which corresponds to the burst-out commencing position P of the air bag 17.

A description will now be made with respect to functioning of a fabric as the reinforcing member 18.

Namely, the cushion pad 11 is usually molded as a cushion material of a predetermined shape and a predetermined stiffness by charging a material in a mold and causing the material to expand under heat or the like. Upon conducting this molding, a fabric 18, as the reinforcing member, is disposed beforehand at a predetermined position within the mold and the material is charged in the mold and is then cured there. As a result, the fabric 18 is fixedly secured on a surface of the thus-molded cushion pad 11 at the predetermined position.

During this molding, the liquefied cushion pad material tends to concentrate in a vicinity of a skin of the cushion pad, that is, a cushion pad portion brought into contact with the mold. This leads to a characteristic feature that, after the material is cured, the cushion pad becomes higher in stiffness and strength in the skin than in the remaining portion (i.e., the inside portion of the cushion pad 11).

When the fabric 18 is placed beforehand within a mold at a position corresponding to the skin of the cushion pad 11 to be molded, the fabric 18 is therefore internally impregnated with the liquefied cushion pad material so that the thus-impregnated cushion pad material is allowed to cure within the fabric 18. Owing to the inclusion of this fabric 18, the skin is provided with the thicker cured layer so that still higher stiffness and strength are imparted to the skin. The fabric 18 therefore functions as a reinforcing member.

In view of this mechanism, the greater the thickness of the fabric 18 as the reinforcing member, the more the impregnation of the fabric 18 with the cushion pad material and hence, the further the promotion of the curing of the skin of the cushion pad 11. It is therefore preferred to set the thickness of the fabric 18 as a reinforcing member depending on how much the curing of the skin of the cushion pad 11 is desired to be promoted.

Owing to the reinforcement of the rear side of the cushion pad 11 by the reinforcing member 18, the rear side of the cushion pad 11 is enhanced in strength and stiffness. The cushion pad 11 therefore becomes relatively lower in strength and stiffness at portions where the reinforcing member 18 is not arranged. In particular, stress tends to concentrate especially at a boundary, namely, around end portions 18A,18B of the reinforcing member 18 so that the strength is lowered locally at the boundary.

Especially around the end portion 18A of the reinforcing member 18, said end portion 18A being located at the position P which is in front of the side-impact air bag module 3, is within a range of burst-out of the air bag 17 and corresponds to the burst-out commencing position of the air bag 17, the cushion pad 11 is first broken for the relatively lower strength by the pressure of the inflating air bag 17 upon causing the air bag 11 to burst out, whereby the air bag 11 is allowed to burst out of the seat back 1 through the broken part. Accordingly, the reinforcing member 18 functions as a guide member for defining the portion 20 along which the cushion pad 11 breaks under bursting force of the air bag 17.

Incidentally, the end portion 18A of the reinforcing member 18 extends linearly in a vertical direction. By the burst of the air bag 17 out of the sideimpact air bag module 3 which also extends in the vertical direction, the cushion pad 11 is linearly broken along the vertically-extending end portion 18A. As a result, the air bag 17 which extends in the vertical direction is allowed to promptly burst out over the entire vertical length of the side-impact air bag module 3.

Because the automobile seat according to the first embodiment of the present invention is constructed as described above, the seat back 1 can accommodate therein the side-impact air bag module 3, which is internally provided with the side air bag 17, and can promptly burst out the air bag 17 at the predetermined position in the predetermined direction without arrangement of any additional member such as a lid on the surface of the seat back 1, in other words, while maintaining the seat back 1 in the same surface conditions as a seat back having no side air bag accommodated therein.

At the rear side of the cushion pad 11 in front of the side-impact air bag module 3 (namely, the air bag 17), the cushion pad 11 is locally lower in strength along the end portion (in other words, a cut edge) 18A of the reinforcing member 18 compared with its remaining portion. Upon inflation of the air bag 17, the inflating air bag 17 presses the rear side of the cushion pad 11 so that around the end portion 18A of the reinforcing member 18, the cushion pad 11 is linearly broken in the vertical direction. As a result, the vertically-extending air bag 17 is allowed to promptly burst out over the entire vertical length of the side-impact air bag module 3.

As the air bag 17 is allowed to burst out by the breakage of the cushion pad 11 as described above, it is possible to allow the air bag 17 to promptly burst out at a desired position in a desired direction by simply adjusting the position of the end portion 18A of the reinforcing member 18. Described specifically, a positional adjustment of the end portion 18A of the reinforcing member 18 makes it possible to achieve both an adjustment in the burst-out commencing position of the air bag 17 and an adjustment in the positional relationship among the end portion 18A, the air bag 17 and the unillustrated inflator, whereby the direction of burst-out of the air bag 17 can also be adjusted.

As is understood from the foregoing, the automobile seat according to the first embodiment of this invention can surely meet conditions required as a side air bag, that is, can surely achieve prompt burstout to a predetermined position (namely, to a position required for the protection of an occupant) whenever needed while maintaining good external appearance for the seat back 1, in other words, a similar external appearance as a seat back having no side air bag accommodated therein.

The fabric 18 as the reinforcing member is effective not only in improving the strength and stiffness of the seat back 1 but also in avoiding, owing to its arrangement between the cushion pad 11 and a metal such as the frame 6, occurrence of noise (frictional noise) which would otherwise take place by direct contact between the cushion pad 11 and the frame 6.

In this embodiment, the reinforcing member 18 is arranged so that it extends from the point sufficiently apart from the position of arrangement of the sideimpact air bag module 3 toward the center of the seat back to the point located in front of the position of arrangement of the side impact bag module 3. This reinforcing member 18 can also be arranged at another position. As is shown by a phantom in FIG. 2, for example, another reinforcing member 19 may also be arranged on an outer side of the burst-out commencing position P (in other words, the position where the air bag 17 is desired to commence burst-out), that is, on a side of the side body. In essence, it is only necessary to leave the seat cushion 11 weaker in strength at only one position corresponding to the burst-out commencing position P.

The portion of the seat cushion 11, which is weaker in strength, is the portion where the reinforcing member 18 is not arranged, especially the portion along the cut edge of the reinforcing member 18. It is of course desired to arrange the weak portion in accordance with the shape of the air bag 17 in the course of its burst-out. In this embodiment, it is desired to arrange the weak portion in such a way that the weak portion extends in the vertical direction in correspondence to the vertically-extending air bag 17. Wherever the burst-out commencing position P is chosen, the construction of the seat according to this embodiment makes it possible to easily arrange such a weak portion in correspondence to the burst-out commencing position P.

Referring next to FIGS. 8 through 13, the second embodiment of the present invention will be described.

Figure 9A:
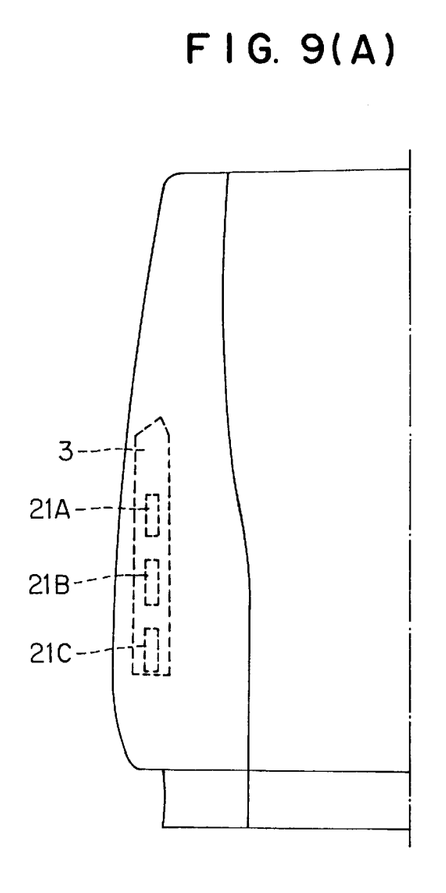
FIG. 9(A) is a schematic front view of a side portion of the seat back and FIG. 9(B) is a schematic side view of the side portion of the seat back.
Figure 9B:
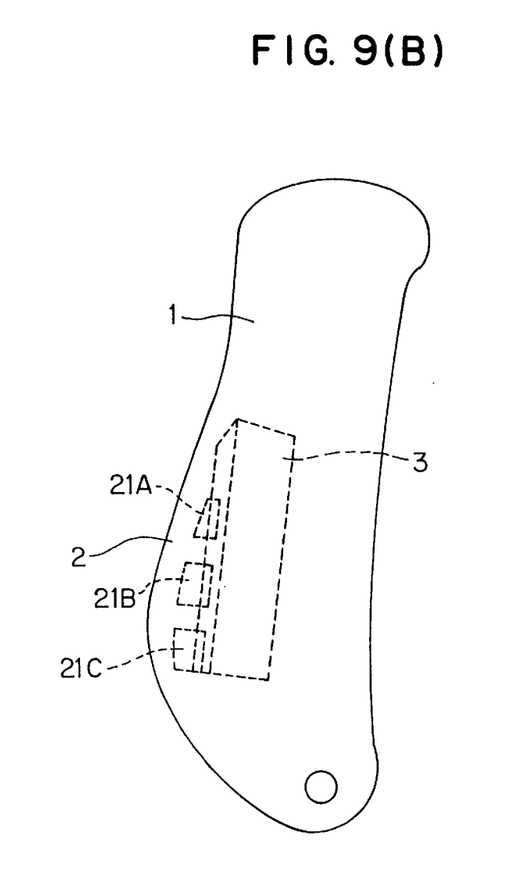
Figure 10:
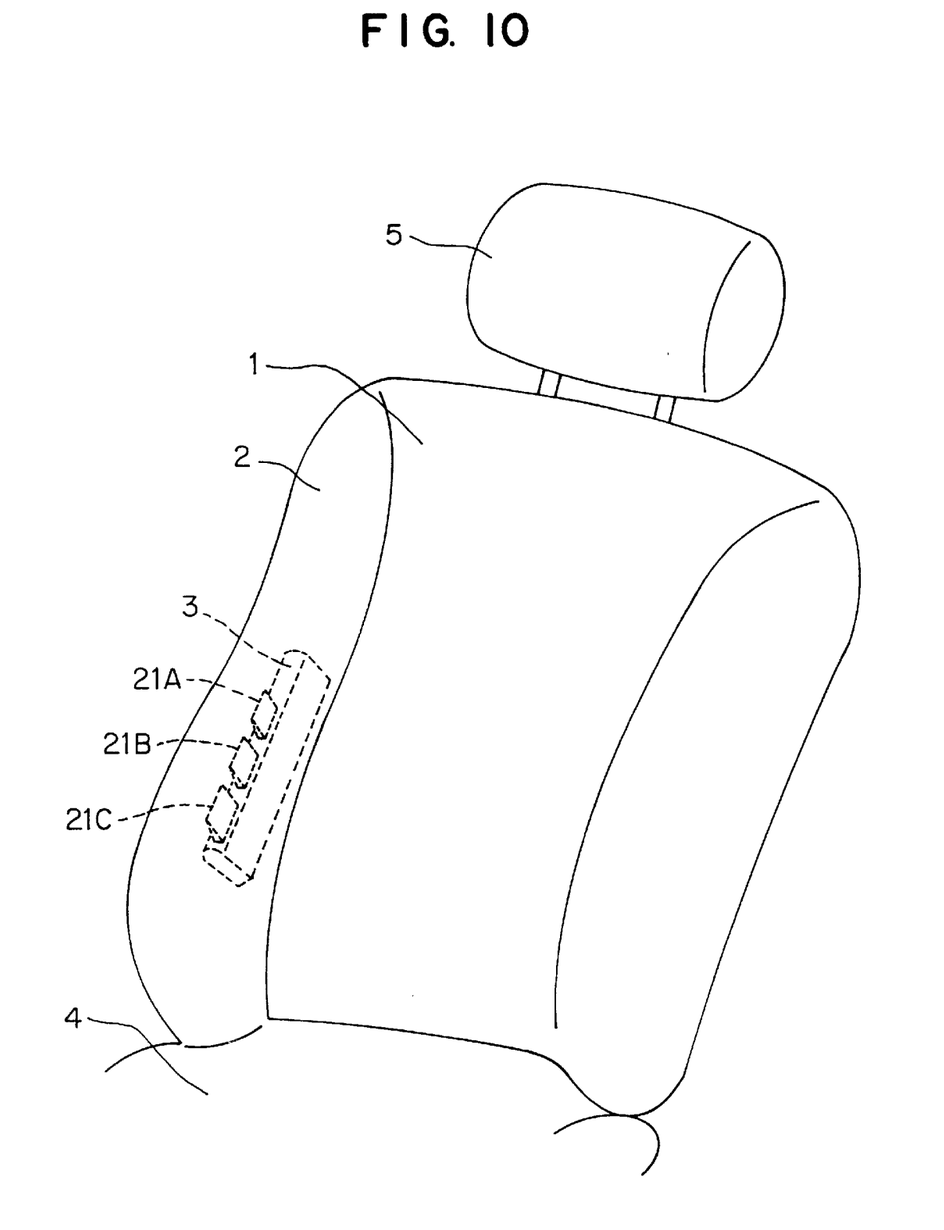
FIG. 10 is a fragmentary perspective view of the seat back of the automobile seat according to the second embodiment of the present invention.

In this embodiment, a side-impact air bag module 3 is accommodated within the side portion 2 of the seat back 1 so that as in the first embodiment, the sideimpact air bag module 3 also extends in a vertical direction as depicted in FIGS. 9(A), 9(B) and 10. The side air bag module 3 is accommodated within the space 12 formed on the rear side of the cushion pad 11, and is fixed via the mounting bracket 7 connected to the frame 6.

Needless to say, a side air bag main body (side air bag or air bag) 17, which is caused to burst out by gas from an inflator, is accommodated within the side-impact air bag module 3.

The rear side of the cushion pad 11 is also covered by a fabric 18 having a certain degree of thickness. This fabric 18 also serves as a reinforcing member to increase the strength of the cushion pad 11.

Figure 8:
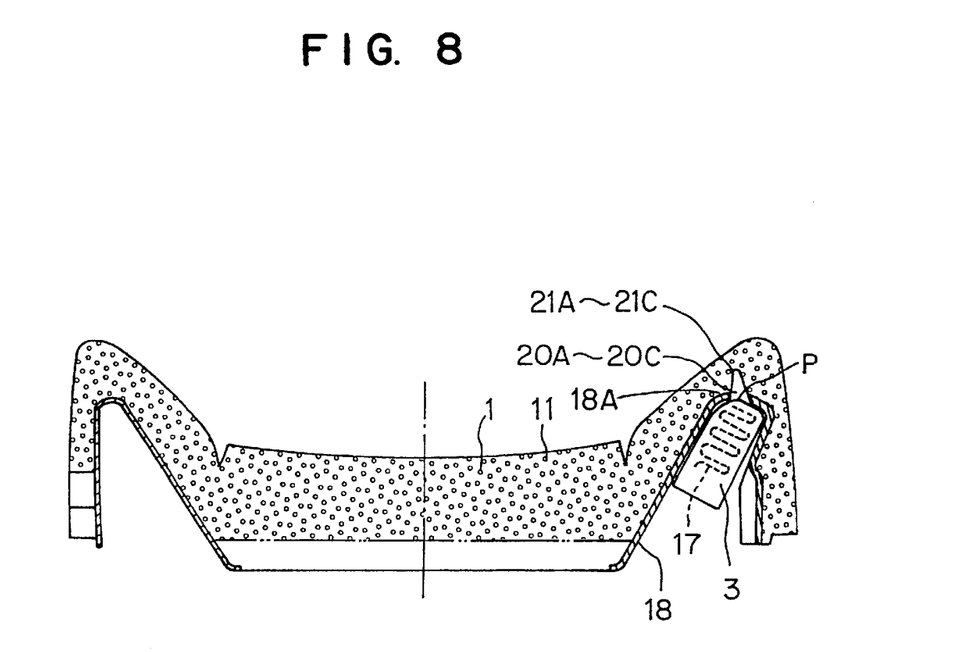
FIG. 8 is a cross-sectional view of a seat back of an automobile seat according to a second embodiment of the present invention.

As is illustrated in FIGS. 8 and 10, the reinforcing member (fabric) 18 in this embodiment is locally omitted at positions corresponding to a burst-out commencing position P of the air bag 17 (in other words, the position where the air bag 17 is desired to commence burst-out) and notches 21A–21C are formed on the rear side of the cushion pad 11 at positions corresponding to the burst-out commencing position P, that is, at positions corresponding to the omitted portions of the reinforcing member (fabric) 18. The omitted portions of the reinforcing member (fabric) 18 are indicated by symbols 20A–20C, respectively. Namely, the notch 21A is formed corresponding to the omitted portion 20A, the notch 21B to the omitted portion 20B, and the notch 21C to the omitted portion 20C.

In particular, the omitted portions 20A–20C of the reinforcing member (fabric) 18 and the notches 21A–21C are arranged at vertical intervals, and these omitted portions 20A–20C of the reinforcing member (fabric) 18 and the notches 21A–21C are formed substantially in alignment with each other. In this embodiment, the notches 21A–21C are each formed in the shape of a wedge which is tapered into a thin edge in the direction of burst-out.

The remaining portions are constructed as in the first embodiment, so that their description is omitted herein.

Because the automobile seat according to the second embodiment of the present invention is constructed as described above, the seat back 1 can accommodate therein, the side-impact air bag module 3, which is internally provided with the side air bag 17, and can promptly burst out the air bag 17 at the predetermined position in the predetermined direction while maintaining the seat back 1 in the same surface conditions as a seat back having no side air bag accommodated therein.

At the rear side of the cushion pad 11 in front of the side-impact air bag module 3 (namely, the air bag 17), the cushion pad 11 is locally lower in strength at a portion, which extends linearly in a vertical direction along the omitted portions 20A–20C of the reinforcing member 18 and the notches 21A–21C of the cushion pad 11, compared with the remaining portion of the cushion pad 11. Upon burst-out of the air bag 17, the inflating air bag 17 presses the rear side of the cushion pad 11 so that at the portion (the omitted portions 20A–20C, the notches 21A–21C), the cushion pad 11 is linearly broken in the vertical direction. As a result, the vertically-extending air bag 17 is allowed to promptly burst out over the entire vertical length of the side-impact air bag module 3.

Further, since the notches 21A–21C are each formed in the shape of the wedge tapered into the thin edge in the direction of burst-out, the guiding of burst-out is assured further.

It is therefore possible to allow the air bag 17 to promptly burst out at a desired position in a desired direction by simply adjusting the position of the end portion 18A of the reinforcing member 18. Described specifically, positional adjustments of the omitted portions 20A–20C of the reinforcing member 18 and the notches 21A–21C of the cushion pad 11 make it possible to achieve both an adjustment in the burst-out commencing position of the air bag 17 and an adjustment in the positional relationship among the end portion 18A, the air bag 17 and the unillustrated inflator, whereby the direction of burst-out of the air bag can also be adjusted.

Wherever the burst-out commencing position P is chosen, the construction of the seat according to this embodiment obviously makes it possible to easily arrange such omitted portions of the reinforcing member and the notches of the cushion pad 11 in correspondence to the burst-out commencing position P as in the first embodiment.

As is understood from the foregoing, the automobile seat according to the second embodiment of this invention can also surely meet conditions required as a side air bag, that is, can surely achieve prompt burst-out to a predetermined position (namely, to a position required for the protection of an occupant) whenever needed while maintaining good external appearance for the seat back 1, in other words, a similar external appearance as a seat back having no side air bag accommodated therein.

Incidentally, the notches 21A–21C of the cushion pad 11 are arranged at intervals. This is to adjust the stiffness of the cushion pad 11.

Figure 13:
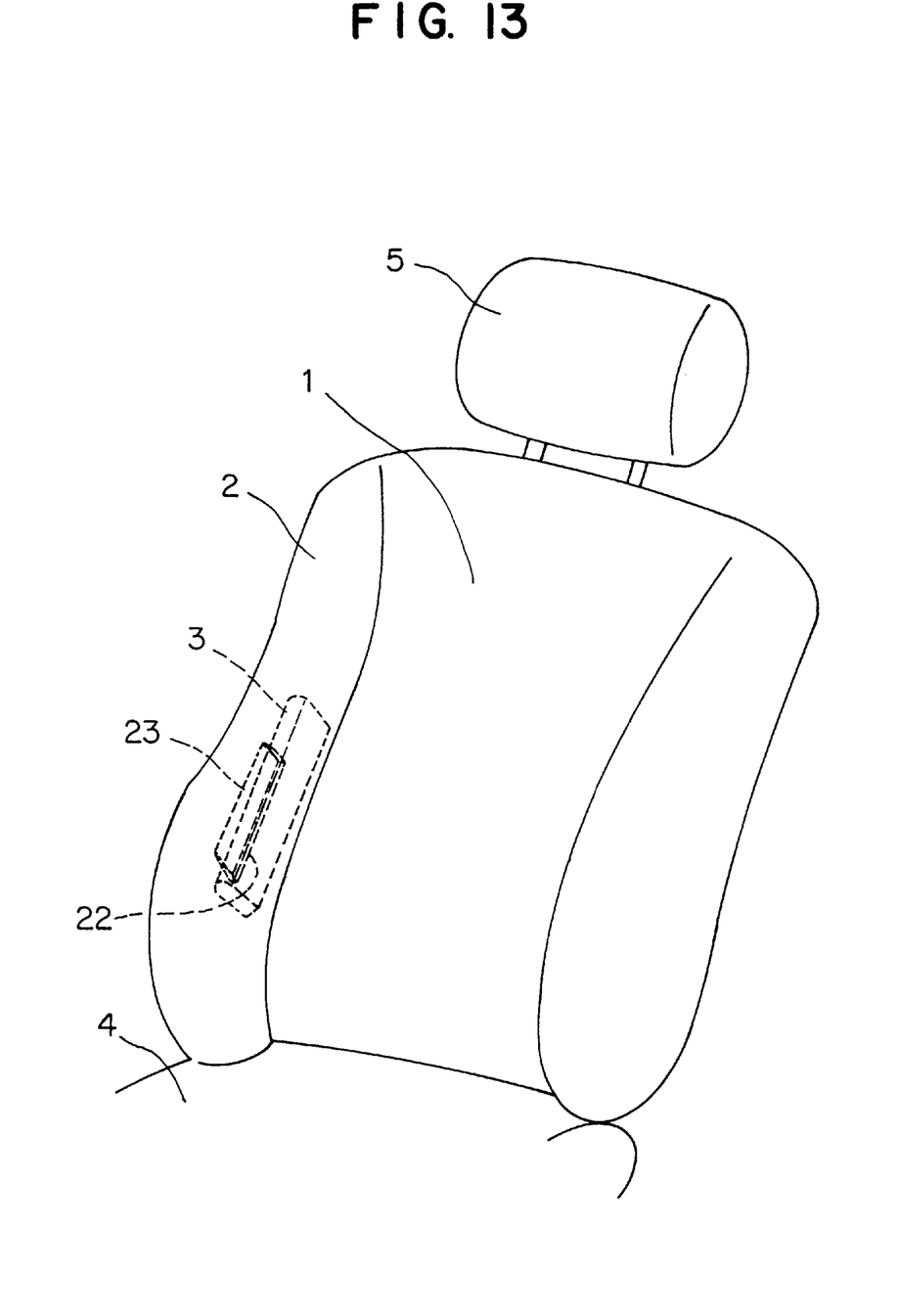
FIG. 13 is a fragmentary perspective view of a seat back of an automobile seat according to a modification of the second embodiment of the present invention.

As shown by way of example in FIG. 13, the notches of the cushion pad 11 can be arranged in the form of a vertically-extending slot (slot-shaped cutoff portion) 23 and corresponding to the vertically-extending slot, the omitted portions of the reinforcing member 18 can be arranged in the form of an vertically-elongated opening (elongated-opening-shaped omitted portion) 22. However, the slot-shaped cut-off portion 23 leads to a reduction in the stiffness of front side of the cushion pad 11 and hence to a greater deformation in the side portion of the cushion pad 11, thereby involving a potential problem that the cushion pad 11 may be lowered in durability at the cut-off portion.

Accordingly, the notches 21A–21C are arranged at intervals so that the burst-out of the side air bag is guided to promptly achieve it at the predetermined position in the predetermined direction while minimizing a reduction in stiffness and maintaining the durability of the cushion pad 11.

Unless such a durability problem exists, the notches of the cushion pad 11 can of course be arranged as the slot-shaped cut-off portion 23 and corresponding to the slot-shaped cut-off portion 23, the omitted portions of the reinforcing member 18 can be arranged as the vertically-extending, elongated-opening-shaped omitted portion 22.

Further, this embodiment has an advantage that upon molding the cushion pad 11, the positioning and fixing of the fabric 18 can be facilitated when the fabric 18 is placed beforehand as the reinforcing member at a predetermined position within a mold.

Figure 11:
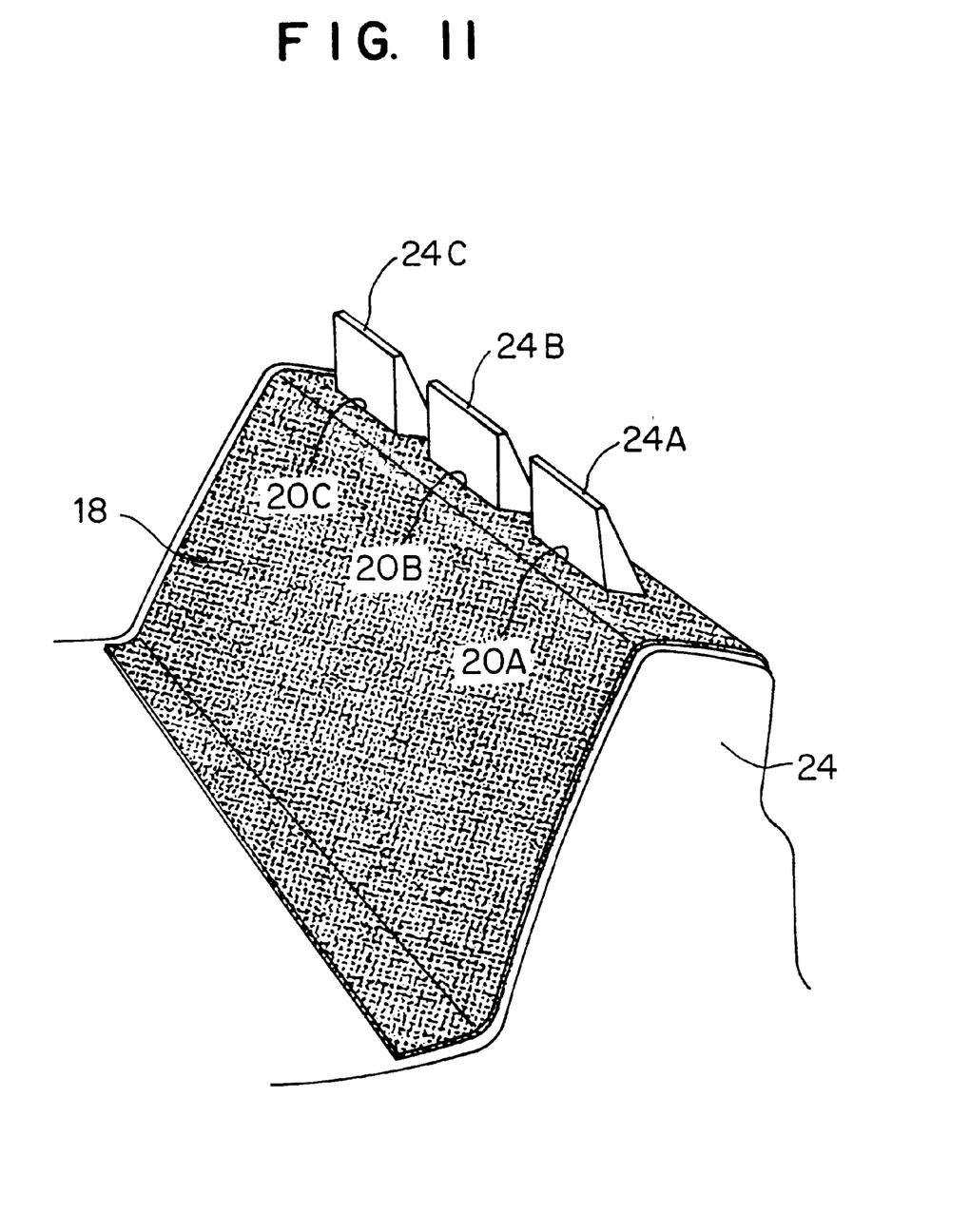
FIG. 11 is a schematic perspective view illustrating production of a cushion pad of the seat back of the automobile seat according to the second embodiment of the present invention.
Figure 12:
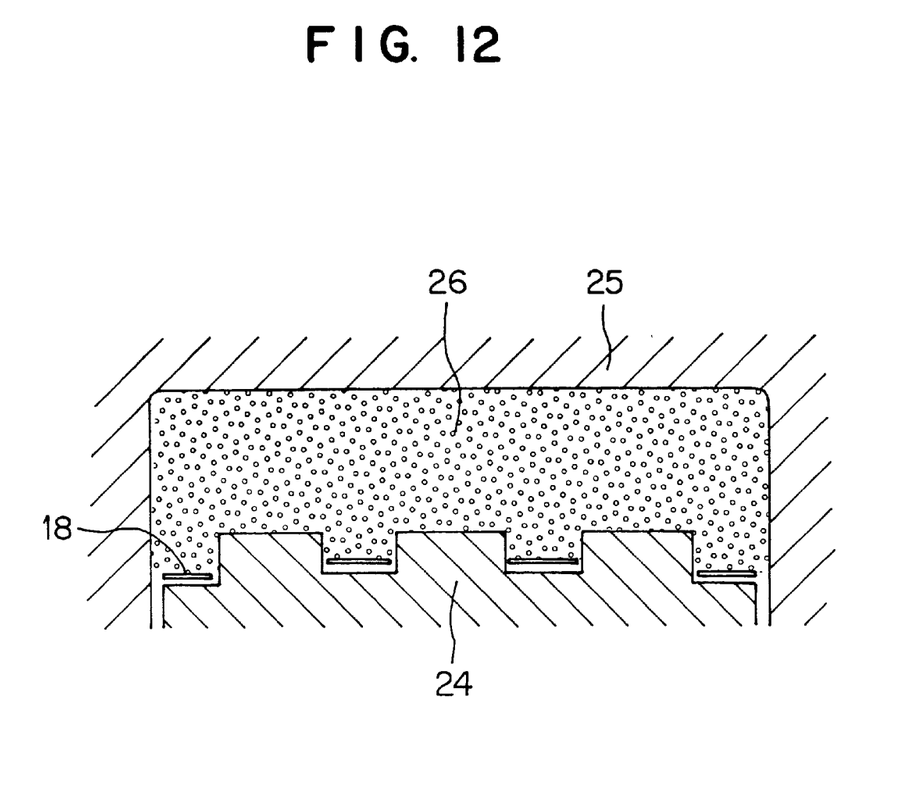
FIG. 12 is a schematic cross-sectional view illustrating the production of the cushion pad of the seat back of the automobile seat according to the second embodiment of the present invention.

Described specifically, the shape of the rear side of the cushion pad 11 in the side portion 2 of the seat back 1 is formed in this embodiment as illustrated in FIGS. 11 and 12. In these drawings, a bottom force 24 is provided with ridge-shaped force portions 24A–24C corresponding to the notches 21A–21C. Designated at numeral 25 is a top force, while indicated at numeral 26 is a cushion pad material.

Upon molding the cushion pad 11, the fabric 18 is placed on the bottom force 24. Since the fabric 18 defines the omitted portions 20A–20C corresponding to the notches 21A–21C, these omitted portions 20A–20C are brought into engagement with the ridge-shaped force portions 24A–24C, respectively, so that the positioning and fixing of the fabric 18 are achieved at the same time. This has led to an improvement in the efficiency of molding work of the cushion pad 11.

It is to be noted that the numbers and shapes of the notches 21A–21C of the cushion pad 11 and the omitted portions 20A–20C of the fabric 18 are not limited to those of the second embodiment.

In the second embodiment, the fabric 18 is provided with the omitted portions 20A–20C in addition to the notches 21A–21C in the cushion pad 11. However, the burst-out performance of the air bag 17 can still be effectively improved even when only the notches 21A–21C are formed in the cushion pad 11. Here again, the number and shape of the notches are not limited to those of the second embodiment evidently. It is however preferred to form the notches in such a shape that the notches define the direction of burst-out of the air bag 17. Further, a single notch may be contemplated as illustrated in FIG. 13. In addition, it may also be contemplated to form a plurality of slotshaped cut-off portions.

As an alternative, it is also possible to arrange the omitted portions 20A–20C alone in the fabric 18. Here again, the number and shape of the omitted portions 20A–20C are not limited to those of the second embodiment, and it may be contemplated to provide the fabric 18 with only one omitted portion. In this case, the construction becomes similar to the first embodiment. When burst-out is guided only by the omitted portion or portions in the reinforcing member 18, the guiding accuracy of the burst-out of the air bag 17 is considered to be improved as the horizontal width of each omitted portion becomes smaller (in other words, as each omitted portion becomes closer to a vertical straight line) no matter how many omitted portions are formed in the reinforcing member 18.

The reinforcing member 18 is not limited to a fabric but may also be made of another material such as a resin film, plate or the like insofar as it can provide the cushion pad 11 with a local portion lower in strength around the reinforcing member 18 or at the omitted portion(s) of the reinforcing member 18.

As has been described above in detail, the automobile seat according to the present invention can be provided with an external appearance similar to that of a conventional seat (i.e., a seat with no sideimpact air bag accommodated therein) although it accommodates therein a side-impact air bag. It is possible to bring about the advantage that the air bag is allowed to promptly burst out at a predetermined position in a predetermined direction while maintaining the attractive outward appearance of the seat. Further, the construction of the second embodiment can further improve the effects that the air bag is caused to burst out promptly at a predetermined position in a predetermined direction.

What is claimed is:

1. A seat back of an automobile seat, comprising:
   a cushion pad having an inner surface defining a space therein;
   a side impact air bag module installed within said space, said side impact air bag module having an air bag therein which inflates the air bag between an occupant and an automobile body upon an impact; and
   a substantially planar guide member covering and reinforcing at least a portion of said inner surface of said cushion pad,
   wherein said guide member has a first end and a second end separated from each other by a distance of the length of the guide member, substantially along a longitudinal axis of the space and the first end defines a start of the break portion and the first end is located adjacent a first end of the space and the second end is located adjacent a second end of the space the cushion pad having a break portion, which breaks by an inflating force of said air bag, the break portion is defined by an end of said guide member, the break portion being located adjacent an end of said guide member and a part which is not covered by said guide member in said inner surface of said cushion pad.

2. A seat back of an automobile seat according to claim 1, wherein said guide member is formed as a reinforcing member so that said guide member covers said inner surface of said cushion pad and increases breaking strength of said cushion pad other than said break portion.

3. A seat back of an automobile seat according to claim 2, wherein said guide member is arranged integrally on said inner surface of said cushion pad upon molding said cushion pad.

4. A seat back of an automobile seat according to claim 2, wherein said guide member is adhered on said surface of said cushion pad.

5. A seat back of an automobile seat according to claim 2, wherein said guide member is a sheet having flexibility.

6. A seat back of an automobile seat according to claim 5, wherein said guide member is a fabric sheet impregnated with material of the cushion pad.

7. A seat back of an automobile seat according to claim 6, wherein said fabric sheet is a cloth.

8. A seat back of an automobile seat according to claim 6, wherein said fabric sheet is a non-woven fabric.

9. A seat back of an automobile seat according to claim 5, wherein said guide member is a resin sheet.

10. A seat back of an automobile seat according to claim 1, wherein said guide member defines a weakened portion at said break portion.

11. A seat back of an automobile seat according to claim 1, further comprising:
a seat frame for supporting said cushion pad thereon, wherein said air bag module is mounted on said seat frame.

12. A seat back of an automobile seat according to claim 1, wherein said guide member covers a portion of said inner surface located closer to a front end of an automobile as compared to said air bag module.

13. A seat back of an automobile seat according to claim 1, wherein said guide member covers a portion of said inner surface located closer to a center of said seat back as compared to said air bag module.

14. A seat back of an automobile seat according to claim 1, wherein the guide member is located solely in said space.

15. A seat back of an automobile seat according to claim 1, wherein said space has at least first and second opposing sides and said guide member is located solely and only along the first side.

16. A seat back of an automobile seat, comprising:
a cushion pad having an inner surface defining a space therein;
a side impact air bag module installed within said space, said side impact air bag module having an air bag therein which inflates the air bag between an occupant and an automobile body upon an impact;
a substantially planar guide member covering and reinforcing at least a portion of said inner surface of said cushion pad; and
said guide member has a first end facing in a first direction and a second end facing in a second direction which is opposite to the first direction separated from each other substantially along a longitudinal axis of the space and the first end defines a start of the break portion;
the cushion pad having a break portion, which breaks by an inflating force of said air bag, the break portion is defined by an end of said guide member, the break portion being located adjacent an end of said guide member and a part which is not covered by said guide member in said inner surface of said cushion pad.

17. A seat back of an automobile seat according to claim 16, wherein said space has at least first and second opposing sides and said guide member is located solely and only along the first side.

* * * * *